United States Patent [19]
Uzuki

[11] Patent Number: 5,952,650
[45] Date of Patent: Sep. 14, 1999

[54] SCANNING OPTICAL DEVICE HAVING A MOVABLE COMPOUND OPTICAL SYSTEM

[75] Inventor: Kazuo Uzuki, Abiko, Japan

[73] Assignee: Canon Kabushiki Kaisha, Tokyo, Japan

[21] Appl. No.: 08/963,077

[22] Filed: Nov. 3, 1997

[30] Foreign Application Priority Data

Nov. 8, 1996 [JP] Japan .................................. 8-313017

[51] Int. Cl.[6] ........................................................ H01J 3/14
[52] U.S. Cl. ........................... 250/235; 250/234; 359/210
[58] Field of Search .................................. 250/234, 235, 250/236; 359/210, 205, 209

[56] References Cited

U.S. PATENT DOCUMENTS

| | | | |
|---|---|---|---|
| 3,972,584 | 8/1976 | Lobb | ........................................ 359/433 |
| 5,377,038 | 12/1994 | Uzuki et al. | ............................. 359/205 |
| 5,581,391 | 12/1996 | Uzuki et al. | ............................. 359/205 |

*Primary Examiner*—Que T. Le
*Attorney, Agent, or Firm*—Fitzpatrick, Cella, Harper & Scinto

[57] ABSTRACT

A scanning optical device includes a light source unit, a deflector for deflectively scanning a light beam from the light source unit, a photodetector, and a compound optical system. In the compound optical system, a first optical system for guiding the light beam from the light source unit toward the deflector, and a second optical system for guiding the light beam deflectively scanned by the deflector toward the photodetector are integrally formed. The compound optical system is so held as to be movable in a direction other than an optical axis direction of the first optical system.

14 Claims, 4 Drawing Sheets

SCANNING OPTICAL DEVICE HAVING A MOVABLE COMPOUND OPTICAL SYSTEM

BACKGROUND OF THE INVENTION

1. Field of the Invention

The present invention relates to a scanning optical device used in a laser beam printer, a laser facsimile apparatus, and the like.

2. Related Background Art

FIG. 1 is a plan view of a conventional light deflection scanning device used in an image forming apparatus such as a laser beam printer, a laser facsimile apparatus, and the like. A semiconductor laser light source unit 2 is fixed on the side surface of an optical box 1, and a cylindrical lens 3 and a rotary polygonal mirror 4 are arranged in front of the semiconductor laser light source unit 2. Imaging lenses 5 and 6, and a reflection mirror 7 are arranged in turn in the reflection direction of the rotary polygonal mirror 4, and a rotary drum (not shown) is arranged via an aperture portion 1a formed on the optical box 1 in the reflection direction of the reflection mirror 7. A mirror 8 is set at the position where some light components of light deflected and scanned by the rotary polygonal mirror 4 are incident, and a focusing lens (to be referred to as a BD focusing lens hereinafter) 9 for focusing a light beam to obtain a scanning start signal, and a photodetector (to be referred to as a BD detector hereinafter) 10 for obtaining the scanning start signal are disposed in the reflection direction of the mirror 8.

In this device, the cylindrical lens 3 is arranged so that its center nearly matches the center of the optical axis of the semiconductor laser light source unit 2. The bottom surface of the cylindrical lens 3 contacts a reference surface 1b formed on the optical box 1, and an end face 3a of the cylindrical lens 3 contacts a butting reference surface 1c formed on the optical box 1 to extend in a direction parallel to the optical axis direction of the semiconductor laser light source unit 2.

Upon assembling the individual members to the device, the spot size in the sub-scanning direction on the surface of the rotary drum may often deviate from the design value due to factors such as dimensional errors on the optical layout, shape errors of the lens itself, and the like, and for this reason, focus adjustment must be done by moving the cylindrical lens 3. Hence, while the end face 3a of the cylindrical lens 3 is pressed against the butting reference surface 1a on the optical box 1, the lens 3 is slidably moved on the reference surface 1b on the optical box 1. During this slidable movement, the spot size on the surface of the rotary drum is observed, and the cylindrical lens 3 is fixed on the optical box 1 by, e.g., a photosetting adhesive or the like at the position of the minimum spot size.

With this arrangement, a light beam emitted by the semiconductor laser light source unit 2 is irradiated onto the rotary polygonal mirror 4 while being linearly focused by the cylindrical lens 3. Most light components of the light beam deflected and scanned by rotation of the rotary polygonal mirror 4 are irradiated onto the reflection mirror 7 via the imaging lenses 5 and 6, and are reflected by the reflection mirror 7. The reflected light beam reaches a photosensitive member on the rotary drum (not shown) via the aperture portion 1a of the optical box 1. The light beam that has reached the photosensitive member forms an electrostatic latent image on the photosensitive member since it is main-scanned upon rotation of the rotary polygonal mirror 4 and is sub-scanned upon rotation of the rotary drum. Some light components of the light beam deflected and scanned by rotation of the rotary polygonal mirror 4 enter the BD detector 10 via the mirror 8 and BD focusing lens 9.

However, in the above-mentioned prior art, since the cylindrical lens 3 and BD focusing lens 9 are located at independent positions, problems of a size reduction of the device, improvement of productivity, a cost reduction, and the like are posed. To solve these problems, an arrangement that integrally forms the cylindrical lens 3 and BD focusing lens 9 has been proposed. However, in this arrangement, if the optical axes of the cylindrical lens 3 and BD focusing lens 9, which are integrally formed, are set to be parallel to each other, since the laser beam once emitted directly returns to the semiconductor laser light source unit 1, an image write start position detection signal (to be referred to as a BD signal hereinafter) cannot be detected. Furthermore, when focus adjustment is done by moving the cylindrical lens 3 in the optical axis direction, the optical axes between the BD focusing lens 9 and BD detector 10 deviate from each other, thus shifting the reception timing of the BD signal.

SUMMARY OF THE INVENTION

It is an object of the present invention to provide a scanning optical device which can solve the above-mentioned problems, and has a compound lens that can prevent the reception timing of the BD signal from being shifted even when focus adjustment of the cylindrical lens is done.

In order to achieve the above object, a scanning optical device according to the present invention comprises:

a light source unit;

a deflector for deflecting and scanning a light beam coming from the light source unit;

a photodetector; and a compound optical system in which a first optical system for guiding the light beam from the light source unit toward the deflector and a second optical system for guiding the light beam deflected and scanned by the deflector toward the photodetector are integrally formed, and the compound optical system is held to be movable in a direction other than an optical axis of the first optical system.

DETAILED DESCRIPTION OF THE PREFERRED EMBODIMENTS

Figure 1:
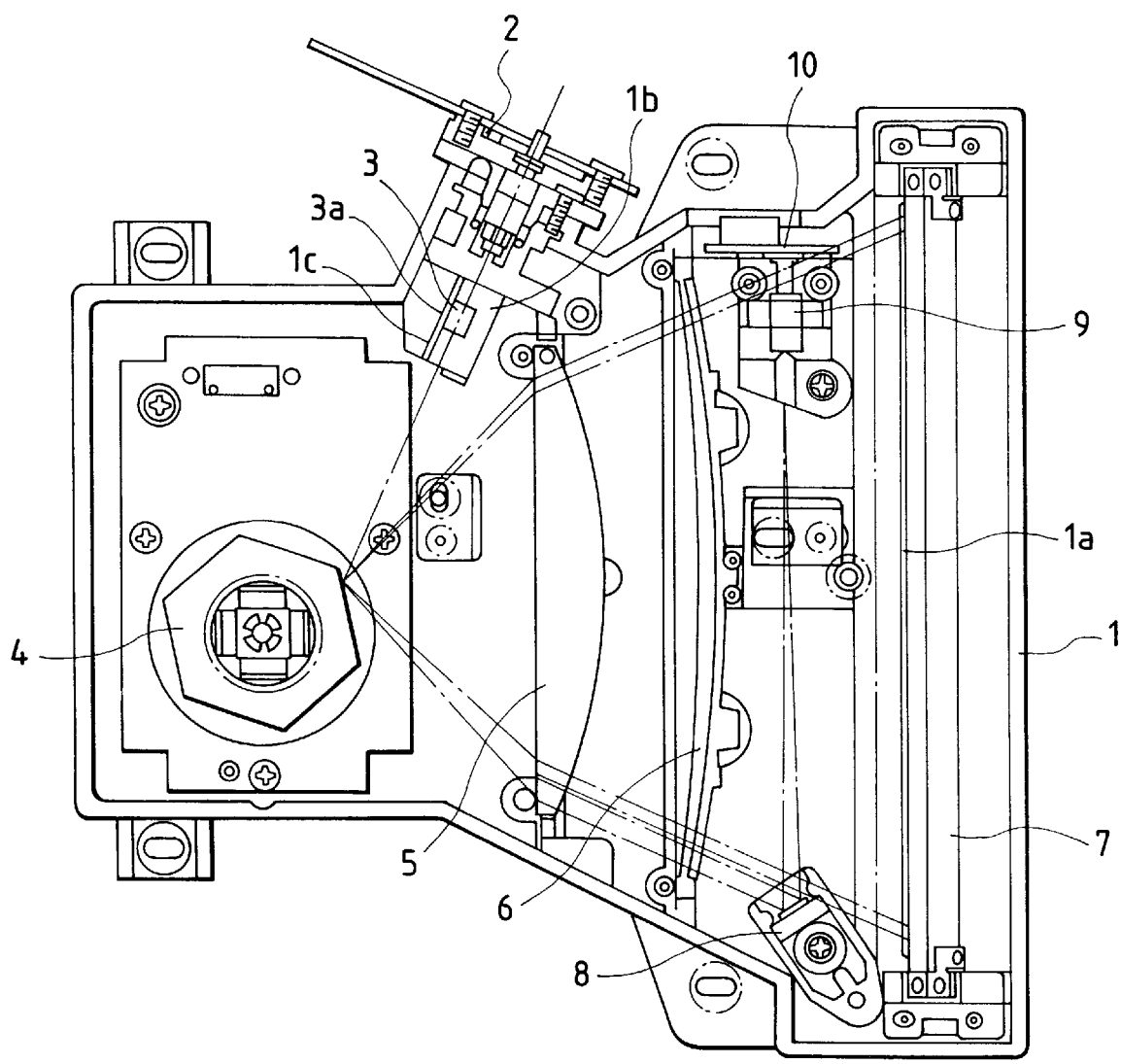
FIG. 1 is a plan view of a conventional scanning optical device.
Figure 2:
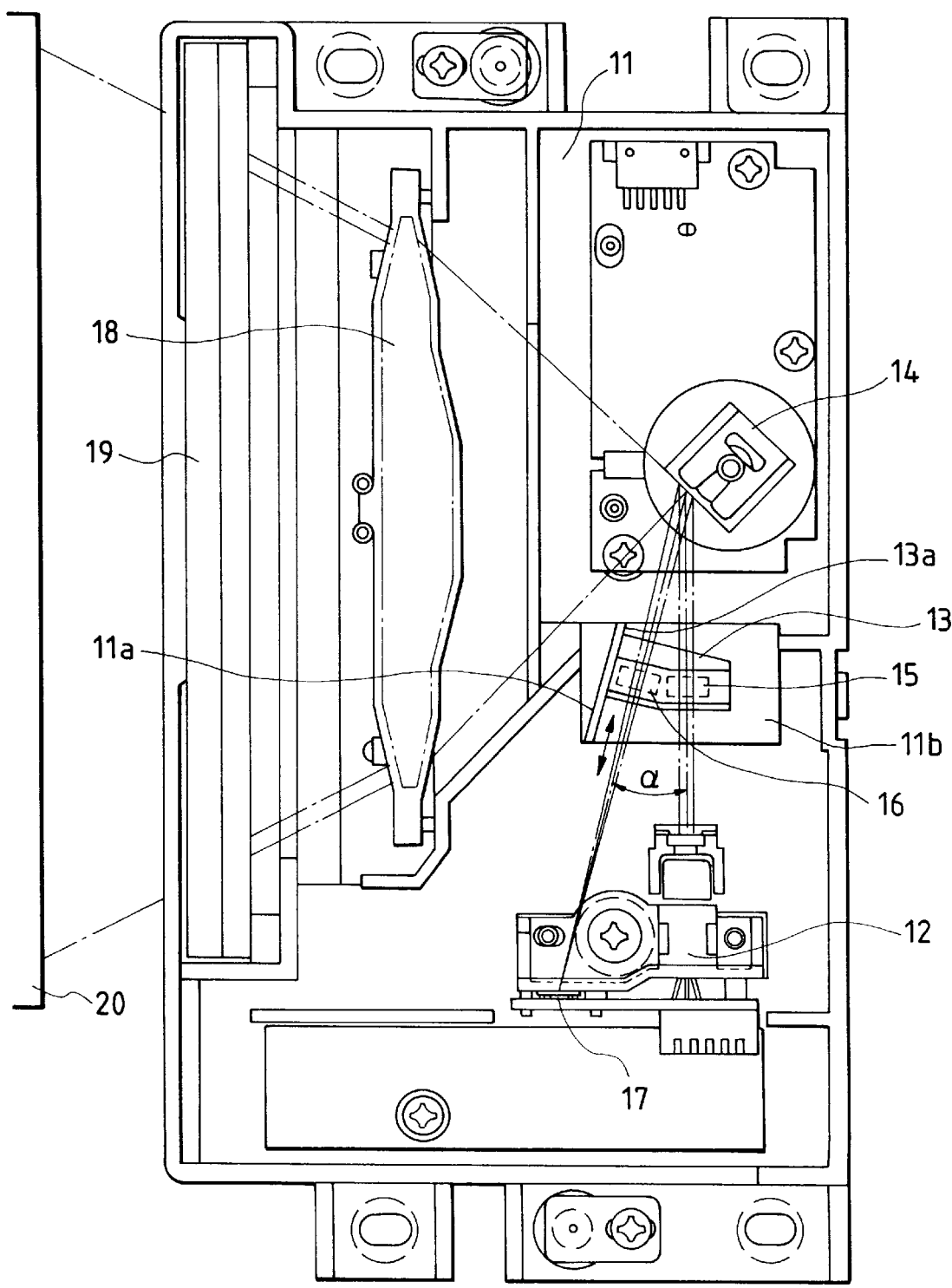
FIG. 2 is a plan view of a scanning optical device according to the first embodiment of the present invention.

FIG. 2 is a plan view showing the state in the main scanning section of a scanning optical device according to the first embodiment. A semiconductor laser light source unit 12 is fixed to the side surface of an optical box 11, and a compound lens 13 and a rotary polygonal mirror 14 are arranged in front of the semiconductor laser light source unit 12. By "main scanning section" is here meant a light beam section formed as a function of time by a light beam deflectively reflected by the deflection surface of the rotary polygonal mirror 14. The compound lens 13 is prepared by integrally forming a cylindrical lens 15 and a BD focusing lens 16, so that their optical axes make an angle α. A BD detector 17 is arranged on a portion of the semiconductor laser light source unit 12 in the transmission direction of the BD focusing lens 16. An imaging lens 18 and reflection mirror 19 are disposed in the reflection direction of the rotary polygonal mirror 14, and a rotary drum 20 is disposed via an aperture portion of the optical box 11 in the reflection direction of the reflection mirror 19. The cylindrical lens 15 has a predetermined refractive power in only in the sub-scanning direction perpendicular to the plane of the drawing of FIG. 2.

Figure 3:
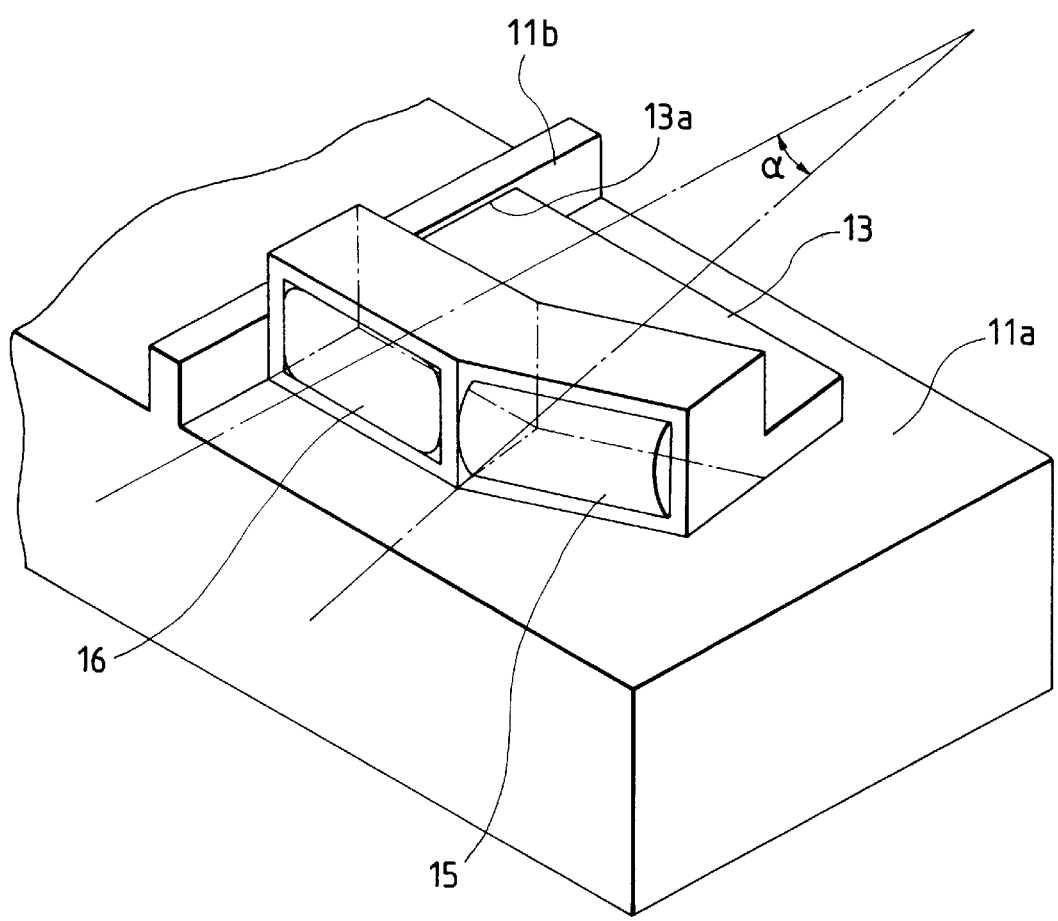
FIG. 3 is a perspective view of a compound lens.

FIG. 3 is a perspective view of the compound lens 13. The bottom surface of the compound lens 13 contacts a reference surface 11a formed on the optical box 11, and the BD focusing lens 16 is arranged so that its center nearly matches the center of the optical axis of the BD detector 17. Also, a butting reference surface 11b is formed on the optical box 11 to extend in a direction parallel to the optical axis direction of the BD focusing lens 16, and contacts an end face 13a of the compound lens 13. The end face 13a is formed on the compound lens 13 to extend in a direction parallel to the optical axis of the BD focusing lens 16.

As in the prior art, the spot size in the sub-scanning direction on the surface of the rotary drum may often deviate from the design value due to factors such as dimensional errors on the optical layout, shape errors of the lens itself, and the like, and for this reason, focus adjustment must be done by moving the compound lens 13. Hence, while the end face 13a of the compound lens 13 is pressed against the butting reference surface 11b of the optical box 11, the compound lens 13 is slidably moved along the reference surface 11b serving as a guide member. During this slidable movement, the spot size on the surface of the rotary drum is observed, and the compound lens 13 is fixed on the optical box 11 at a position where the spot size becomes smallest by using, e.g., a photosetting adhesive or the like.

In this embodiment, since the compound lens 13 is moved within the main scanning section in the optical axis direction of the BD focusing lens 16 which is a direction other than the optical axis direction of the cylindrical lens 15, the cylindrical lens 15 is moved while its optical axis remains parallel to that of the semiconductor laser light source unit 12. At this time, since the optical axes of the cylindrical lens 15 and BD focusing lens 16 have a tilt of the angle α, the position of a light beam incident on the cylindrical lens 15 from the semiconductor laser light source unit 12 would shift left or right in a plane orthogonal to its optical axis. In this case, if this shifting range falls within the effective area of the cylindrical lens 15, no problem is posed. Since the BD focusing lens 16 moves in its optical axis direction, the direction of a light beam propagating toward the BD detector 17 remains unchanged.

A light beam emitted from the semiconductor laser light source unit 12 is irradiated onto the deflection surface of the rotary polygonal mirror 14 while being linearly focused by the cylindrical lens 15 incorporated into the compound lens 13. Most of the light beam deflectively scanned by rotation of the rotary polygonal mirror 14 are irradiated onto the reflection mirror 19 via the imaging lens 18, and the reflected light beam reaches a photosensitive member on the rotary drum 20 via the aperture portion formed on the optical box 11.

The light beam reached the photosensitive member is subjected to the main scanning by rotation of the rotary polygonal mirror and the sub scanning by rotation of the rotary drum to form an electrostatic latent image on the photosensitive member. A part of the light beam deflectively scanned by rotation of the rotary polygonal mirror 14 is guided into the BD detector 17 arranged on a portion of the semiconductor laser light source unit 12 via the BD focusing lens 16 incorporated into the compound lens 13.

Thus, there is provided a structure in which focusing adjustment using the cylindrical lens 15 is done by moving the compound lens 13 in which the cylindrical lens 15 and the BD focusing lens 16 are integrally formed, in the optical axis direction of the BD focusing lens 16, which direction is not parallel to the optical axis direction of the cylindrical lens 15, so that such inexpensive compound lens is used to structure a compact and high quality apparatus in which precision in the image write start position can be satisfactorily maintained high and a light beam can be converged to a small size. Since the compound lens 13 is used, its lens size becomes larger than that of the cylindrical lens 15 solely, and easy handling is assured upon assembly/adjustment, thus relatively improving the precision of the attachment surface.

Figure 4:
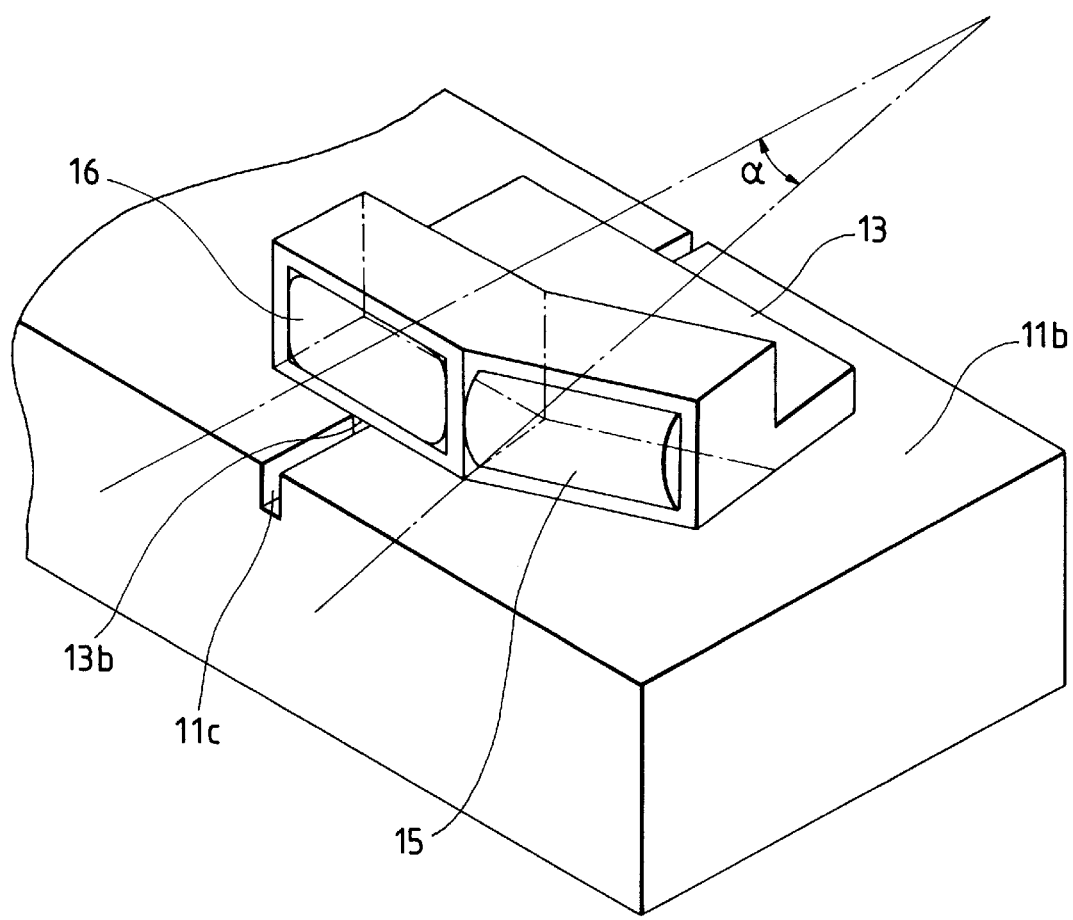
FIG. 4 is a perspective view of a compound lens according to the second embodiment of the present invention.

FIG. 4 is a perspective view of the compound lens 13 according to the second embodiment. A guide rib 13b is formed on the bottom surface of the compound lens 13 and serves as a guide member and extends in a direction parallel to the optical axis direction of the BD focusing lens 16. The guide rib 13b is fitted into a guide groove 11c, which is formed on the optical box 11 and extends in a direction parallel to the optical axis of the BD detector 17.

In this case, when the compound lens 13 is slidably moved along the guide groove 11c, focus adjustment of the cylindrical lens 15 incorporated into the compound lens 13 can be done without influencing the light beam used for detecting a BD signal as in the first embodiment.

As described above, as the scanning optical device according to the present invention uses a compound lens in which a cylindrical lens and BD focusing lens are integrally formed, and holds the compound lens to be movable in a direction other than the optical axis direction of the cylindrical lens, a compact, high-image quality device which can maintain high precision of the image write start position using an inexpensive compound lens and can converge a light beam to a small spot size can be realized.

What is claimed is:

1. A scanning optical device comprising:
    a light source unit;
    a deflector for deflecting and scanning a light beam from said light source unit;
    a photodetector; and
    a compound optical system in which a first optical system for guiding the light beam from said light source unit toward said deflector and a second optical system for guiding the light beam deflectively scanned by said deflector toward said photodetector are integrally formed, said compound optical system being held to be movable in a direction other than an optical axis of said first optical system.

2. A device according to claim 1, wherein said compound optical system is held to be movable in the direction other than the optical axis of said first optical system in a main scanning section.

3. A device according to claim 1, wherein said compound optical system is held to be movable in a direction which is not parallel to an optical axis direction of said first optical system in a main scanning section.

4. A device according to claim 1, wherein said compound optical system is held to be movable in an optical axis direction of said second optical system in a main scanning section.

5. A device according to claim 1, wherein said first optical system comprises a cylindrical lens for linearly focusing a light beam on a deflection surface of said deflector.

6. A device according to claim 1, further comprising an optical box to which said light source unit, deflector, photodetector, and compound optical system are set, and wherein said optical box has a guide member which serves as a reference surface used when said compound optical system is moved.

7. A device according to claim 1, further comprising an optical box to which said light source unit, deflector, photodetector, and compound optical system are set, and wherein said compound optical system has a guide member which is fitted into a guide groove formed on said optical box when said compound optical system is moved.

8. A laser beam printer apparatus comprising:

a light source unit;

a deflector for deflecting and scanning a light beam from said light source unit;

a photodetector;

a compound optical system in which a first optical system for guiding the light beam from said light source unit toward said deflector and a second optical system for guiding the light beam deflectively scanned by said deflector toward said photodetector are integrally formed, said compound optical system being held to be movable in a direction other than an optical axis of said first optical system; and a photosensitive member for receiving the light beam deflectively scanned by said deflector.

9. An apparatus according to claim 8, wherein said compound optical system is held to be movable in the direction other than the optical axis of said first optical system in a main scanning section.

10. An apparatus according to claim 8, wherein said compound optical system is held to be movable in a direction which is not parallel to an optical axis direction of said first optical system in a main scanning section.

11. An apparatus according to claim 8, wherein said compound optical system is held to be movable in an optical axis direction of said second optical system in a main scanning section.

12. An apparatus according to claim 8, wherein said first optical system comprises a cylindrical lens for linearly focusing a light beam on a deflection surface of said deflector.

13. An apparatus according to claim 8, further comprising an optical box to which said light source unit, deflector, photodetector, and compound optical system are set, and wherein said optical box has a guide member which serves as a reference surface used when said compound optical system is moved.

14. An apparatus according to claim 8, further comprising an optical box to which said light source unit, deflector, photodetector, and compound optical system are set, and wherein said compound optical system has a guide member which is fitted into a guide groove formed on said optical box when said compound optical system is moved.

* * * * *

UNITED STATES PATENT AND TRADEMARK OFFICE
CERTIFICATE OF CORRECTION

PATENT NO. : 5,952,650
DATED : September 14, 1999
INVENTOR(S) : KAZUO UZUKI

It is certified that error appears in the above-identified patent and that said Letters Patent is hereby corrected as shown below:

COLUMN 1
  Line 47, "1a" should read --1c--.

COLUMN 3
  Line 15, "11a" should read --11b--.
  Line 18, "11b" should read --11a--.
  Line 31, "11b" should read --11a--.
  Line 59, "are" should read --is--.
  Line 64, "reached" should read --reaching--.

Signed and Sealed this

Twenty-fifth Day of July, 2000

Attest:

Q. TODD DICKINSON

*Attesting Officer*　　　*Director of Patents and Trademarks*